US012750778B2

(12) United States Patent
Yoshimura

(10) Patent No.: US 12,750,778 B2
(45) Date of Patent: Sep. 29, 2026

(54) WIRELESS COMMUNICATION DEVICE AND WIRELESS COMMUNICATION METHOD

(71) Applicant: JVCKENWOOD Corporation, Yokohama (JP)

(72) Inventor: Motoshi Yoshimura, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 159 days.

(21) Appl. No.: 18/798,874

(22) Filed: Aug. 9, 2024

(65) Prior Publication Data

US 2024/0406868 A1 Dec. 5, 2024

Related U.S. Application Data

(63) Continuation of application No. PCT/JP2023/004417, filed on Feb. 9, 2023.

(30) Foreign Application Priority Data

Feb. 28, 2022 (JP) ................................ 2022-029915

(51) Int. Cl.
*H04W 52/02* (2009.01)
*H04W 40/10* (2009.01)

(52) U.S. Cl.
CPC ....... *H04W 52/0229* (2013.01); *H04W 40/10* (2013.01)

(58) Field of Classification Search
CPC ............. H04W 52/0229; H04W 40/10; H04W 52/0219; H04W 40/26; H04W 40/04; H04W 52/02; Y02D 30/70
See application file for complete search history.

(56) References Cited

U.S. PATENT DOCUMENTS

2007/0086471 A1* 4/2007 Igarashi ................ H04W 72/56 370/412
2010/0195551 A1 8/2010 Kuwana
(Continued)

FOREIGN PATENT DOCUMENTS

EP 1578095 A1 * 9/2005 ........ H04W 52/0229
JP 2009-081585 4/2009
(Continued)

*Primary Examiner* — Yuwen Pan
(74) *Attorney, Agent, or Firm* — Amin, Turocy & Watson, LLP

(57) ABSTRACT

A wireless communication device that has an intermittent reception mode in which a reception waiting state and a sleep state are repeated at regular intervals includes: a function switching signal generation unit configured to generate a function switching signal for switching between an enabled state and a disabled state of the intermittent reception mode; a transmission unit configured to transmit the generated function switching signal to other wireless communication devices; a reception unit configured to receive, from the other wireless communication devices, one of a response signal for the transmitted function switching signal and the function switching signal; and a function switching unit configured to switch between the enabled state and the disabled state of the intermittent reception mode in accordance with one of the generated function switching signal and the received function switching signal.

6 Claims, 15 Drawing Sheets

(56) References Cited

U.S. PATENT DOCUMENTS

| | | | | |
|---|---|---|---|---|
| 2024/0023162 | A1* | 1/2024 | Esswie .............. | H04W 74/0866 |
| 2025/0227613 | A1* | 7/2025 | Bastani ............. | H04W 52/0235 |

FOREIGN PATENT DOCUMENTS

| | | | | | |
|---|---|---|---|---|---|
| JP | 2016-158031 | | | 9/2016 | |
| KR | 20120033286 | A | * | 4/2012 | ........ H04W 52/0219 |
| WO | WO-2025182564 | A1 | * | 9/2025 | ........ H04W 72/0453 |

* cited by examiner

28a

| ID | FIRST RESPONSE SIGNAL RECEPTION INFORMATION | FIRST FUNCTION SWITCHING SIGNAL TRANSMISSION INFORMATION | BATTERY REMAINING CAPACITY INFORMATION |
|---|---|---|---|
| 1 | | | |
| 2 | | | |
| 3 | | | |
| 4 | | | |

| TRANS-MISSION DESTINA-TION ID | TRANS-MISSION SOURCE ID | RESPONSE SIGNAL TYPE INFORMATION | BATTERY REMAINING CAPACITY INFORMATION |
|---|---|---|---|
| A1 | B1 | C1 | D1 |

FIG.10

28Aa

| ID | FIRST RESPONSE SIGNAL RECEPTION INFORMATION | FIRST FUNCTION SWITCHING SIGNAL TRANSMISSION INFORMATION | BATTERY REMAINING CAPACITY INFORMATION |
|---|---|---|---|
| 1 | ✓ | | 80% |
| 2 | ✓ | | 90% |
| 3 | ✓ | | 75% |
| 4 | | | |

FIG.11

28Ba

| ID | FIRST RESPONSE SIGNAL RECEPTION INFORMATION | FIRST FUNCTION SWITCHING SIGNAL TRANSMISSION INFORMATION | BATTERY REMAINING CAPACITY INFORMATION |
|---|---|---|---|
| 1 | ✓ | ✓ | 80% |
| 2 | ✓ | | 90% |
| 3 | ✓ | | 75% |
| 4 | | | |

FIG.12

| TRANS-MISSION DESTINA-TION ID | TRANS-MISSION SOURCE ID | RESPONSE SIGNAL TYPE INFORMATION |
|---|---|---|
| A11 | B11 | C11 |

FIG.13

28Ca

| ID | FIRST RESPONSE SIGNAL RECEPTION INFORMATION | FIRST FUNCTION SWITCHING SIGNAL TRANSMISSION INFORMATION | BATTERY REMAINING CAPACITY INFORMATION |
|---|---|---|---|
| 1 | ✓ | ✓ | 80% |
| 2 | ✓ | | 90% |
| 3 | ✓ | | 75% |
| 4 | ✓ | | 82% |

FIG.14

28Da

| ID | FIRST RESPONSE SIGNAL RECEPTION INFORMATION | FIRST FUNCTION SWITCHING SIGNAL TRANSMISSION INFORMATION | BATTERY REMAINING CAPACITY INFORMATION | EMERGENCY STATE INFORMATION |
|---|---|---|---|---|
| 1 | | | | |
| 2 | | | | |
| 3 | | | | |
| 4 | | | | |

FIG.15

28b

| ID | THIRD RESPONSE SIGNAL RECEPTION INFORMATION | SECOND FUNCTION SWITCHING SIGNAL TRANSMISSION INFORMATION | BATTERY REMAINING CAPACITY INFORMATION |
|---|---|---|---|
| 1 | | | |
| 2 | | | |
| 3 | | | |
| 4 | | | |

FIG.19

28Ab

| ID | THIRD RESPONSE SIGNAL RECEPTION INFORMATION | SECOND FUNCTION SWITCHING SIGNAL TRANSMISSION INFORMATION | BATTERY REMAINING CAPACITY INFORMATION |
|---|---|---|---|
| 1 | ✓ | | 80% |
| 2 | ✓ | | 90% |
| 3 | ✓ | | 75% |
| 4 | | | |

FIG.20

28Bb

| ID | THIRD RESPONSE SIGNAL RECEPTION INFORMATION | SECOND FUNCTION SWITCHING SIGNAL TRANSMISSION INFORMATION | BATTERY REMAINING CAPACITY INFORMATION |
|---|---|---|---|
| 1 | ✓ | ✓ | 80% |
| 2 | ✓ | | 90% |
| 3 | ✓ | | 75% |
| 4 | | | |

FIG.21

28Cb

| ID | THIRD RESPONSE SIGNAL RECEPTION INFORMATION | SECOND FUNCTION SWITCHING SIGNAL TRANSMISSION INFORMATION | BATTERY REMAINING CAPACITY INFORMATION |
|---|---|---|---|
| 1 | ✓ | ✓ | 80% |
| 2 | ✓ | | 90% |
| 3 | ✓ | | 75% |
| 4 | ✓ | | 82% |

FIG.22

28Db

| ID | THIRD RESPONSE SIGNAL RECEPTION INFORMATION | SECOND FUNCTION SWITCHING SIGNAL TRANSMISSION INFORMATION | BATTERY REMAINING CAPACITY INFORMATION | EMERGENCY STATE CANCELLATION INFORMATION |
|---|---|---|---|---|
| 1 | | | | |
| 2 | | | | |
| 3 | | | | |
| 4 | | | | |

WIRELESS COMMUNICATION DEVICE AND WIRELESS COMMUNICATION METHOD

CROSS-REFERENCE TO RELATED APPLICATIONS

This application is a Continuation of PCT International Application No. PCT/JP2023/004417 filed on Feb. 9, 2023 which claims the benefit of priority from Japanese Patent Applications No. 2022-029915 filed on Feb. 28, 2022, the entire contents of both of which are incorporated herein by reference.

FIELD OF THE INVENTION

The present application related to a wireless communication device and a wireless communication method.

BACKGROUND OF THE INVENTION

Some wireless communication devices are able to switch between an enabled state and a disabled state of a battery save function. This is a technology in which, when the battery save function is enabled, a voice signal is received in intermittent reception operation in which a reception waiting period and a sleep period are repeated at regular intervals. Japanese Laid-open Patent Publication No. 2016-158031 A discloses a technology for determining a transmission timing of a request signal based on a beacon signal that is transmitted from a specific device, and transmitting the request signal to a communication device at the determined transmission timing while avoiding a sleep period.

When an emergency occurs with respect to a user, a voice signal is transmitted to each of wireless communication devices that perform group communication. However, when the battery save function is enabled, the wireless communication devices are not able to receive the voice signal during the sleep period. There is a need for a technology that appropriately enables communication regardless of the state of the battery save function of each of the wireless communication devices that participate in the group communication.

SUMMARY OF THE INVENTION

A wireless communication device and a wireless communication method are disclosed.

According to one aspect, there is provided a wireless communication device that has an intermittent reception mode in which a reception waiting state and a sleep state are repeated at regular intervals comprising: a function switching signal generation unit configured to generate a function switching signal for switching between an enabled state and a disabled state of the intermittent reception mode; a transmission unit configured to transmit the generated function switching signal to other wireless communication devices; a reception unit configured to receive, from the other wireless communication devices, one of a response signal for the transmitted function switching signal and the function switching signal; a function switching unit configured to switch between the enabled state and the disabled state of the intermittent reception mode in accordance with one of the generated function switching signal and the received function switching signal; a list generation unit configured to generate a list by associating instruction signal transmission information indicating that the function switching signal is transmitted and response signal reception information indicating that the response signal is received with an identifier of each of the other wireless communication devices for group communication including the own wireless communication device; a determination unit configured to determine whether the list includes the identifier with which the response signal reception information is not associated; and a selection unit configured to select, when the determination unit determines that the list includes the identifier with which the response signal reception information is not associated after a predetermined time set in advance from transmission of the function switching signal, at least one of the other wireless communication devices with which the response signal reception information is associated in the list as a relay destination wireless communication device, wherein the transmission unit is further configured to transmit the list to the relay destination wireless communication device.

According to one aspect, there is provided a wireless communication method that is implemented by a wireless communication device that has an intermittent reception mode in which a reception waiting state and a sleep state are repeated at regular intervals comprising: generating a function switching signal for switching between an enabled state and a disabled state of the intermittent reception mode; transmitting the generated function switching signal to other wireless communication devices; receiving, from the other wireless communication devices, one of a response signal for the transmitted function switching signal and the function switching signal; switching between the enabled state and the disabled state of the intermittent reception mode in accordance with one of the generated function switching signal and the received function switching signal; generating a list by associating instruction signal transmission information indicating that the function switching signal is transmitted and response signal reception information indicating that the response signal is received with an identifier of each of the other wireless communication devices for group communication including the own wireless communication device; determining whether the list includes the identifier with which the response signal reception information is not associated; and selecting, when determining that the list includes the identifier with which the response signal reception information is not associated after a predetermined time set in advance from transmission of the function switching signal, at least one of the other wireless communication devices with which the response signal reception information is associated in the list as a relay destination wireless communication device, wherein the transmitting further comprises transmitting the list to the relay destination wireless communication device.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 10 is a diagram illustrating an example of an updated response information list according to the first embodiment;

FIG. 11 is a diagram illustrating an example of an updated response information list according to the first embodiment;

FIG. 12 is a diagram for explaining a second response signal according to the first embodiment;

FIG. 13 is a diagram illustrating an example of an updated response information list according to the first embodiment;

FIG. 14 is a diagram for explaining a response information list according to a modification of the first embodiment;

FIG. 15 illustrates an example of a response information list according to a second embodiment;

FIG. 19 is a diagram illustrating an example of an updated response information list according to the second embodiment;

FIG. 20 is a diagram illustrating an example of an updated response information list according to the second embodiment;

FIG. 21 is a diagram illustrating an example of an updated response information list according to the second embodiment; and FIG. 22 is a diagram for explaining a response information list according to a modification of the second embodiment.

DETAILED DESCRIPTION OF THE INVENTION

Embodiments according to the present application will be described in detail below with reference to the accompanying drawings. The present application is not limited by the embodiments below, and, in the embodiments described below, the same components are denoted by the same reference symbols and repeated explanation will be omitted.

First Embodiment

Configuration Example of Wireless Communication Device

Figure 1:
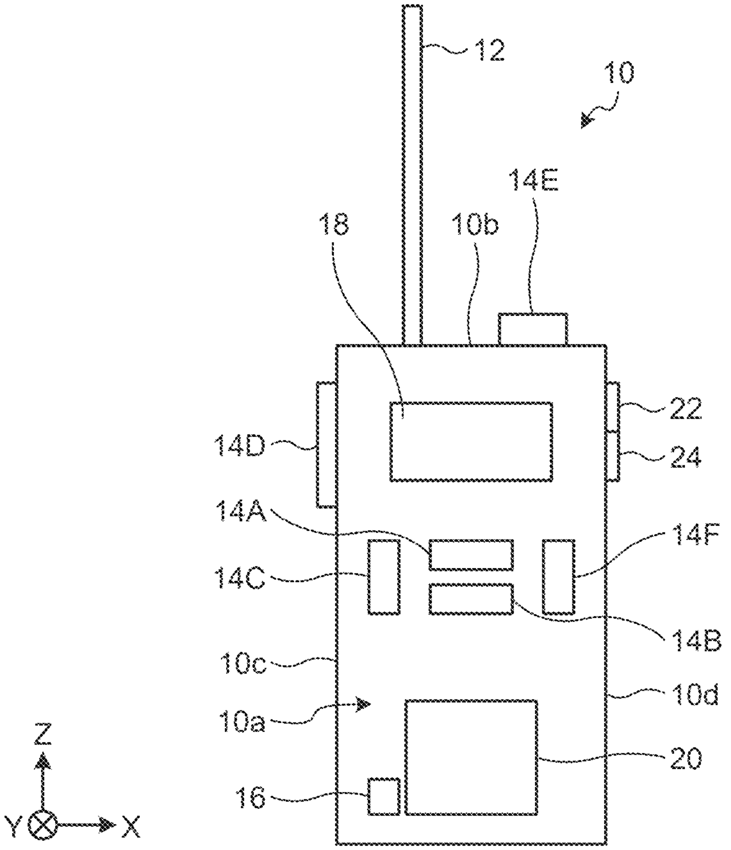
FIG. 1 is a schematic diagram of a wireless communication device according to a first embodiment.

FIG. 1 is a schematic diagram of a wireless communication device according to a first embodiment. As illustrated in FIG. 1, a wireless communication device 10 includes an antenna 12, a switch 14A, a switch 14B, a switch 14C, a switch 14D, a volume operation unit 14E, a power supply switch 14F, a microphone 16, a display 18, a speaker 20, a speaker connection terminal 22, and a microphone connection terminal 24. The wireless communication device 10 is a wireless communication device that is used for business purposes.

The antenna 12 is arranged on an upper surface 10*b* of the wireless communication device 10. The antenna 12 receives a signal from other wireless communication devices as a reception signal. The antenna 12 transmits a signal from the wireless communication device 10 as a transmission signal to other wireless communication devices. A position at which the antenna 12 is arranged is not limited to the upper surface 10*b*, but can be arbitrary.

The switch 14A, the switch 14B, and the switch 14C are arranged on a surface 10*a* of the wireless communication device 10. The switch 14D is arranged on a side surface 10*c* of the wireless communication device 10. The switch 14A, the switch 14B, the switch 14C, and the switch 14D cause the wireless communication device 10 to perform predetermined processes by being operated by a user. The user is able to arbitrarily assign, to the switch 14A, the switch 14B, the switch 14C, and the switch 14D, details of predetermined processes to be performed by the wireless communication device 10. In the present embodiment, for example, at least one of the switch 14A, the switch 14B, the switch 14C, and the switch 14D includes a switching switch for switching between an enabled state and a disabled state of a battery save function of the wireless communication device 10. For example, a Push to Talk (PTT) switch for starting press-to-talk communication may be assigned to one of the switch 14A, the switch 14B, the switch 14C, and the switch 14D. Positions at which the switch 14A, the switch 14B, and the switch 14C are arranged are not limited to the surface 10*a*, but can be arbitrary. A position at which the switch 14D is arranged is not limited to the side surface 10*c*, but can be arbitrary.

The volume operation unit 14E is arranged on the upper surface 10*b* of the wireless communication device 10. The volume operation unit 14E is a switch for adjusting volume of voice that is output from the speaker 20. The volume operation unit 14E is, for example, a rotary knob switch. A position at which the volume operation unit 14E is arranged is not limited to the upper surface 10*b*, but can be arbitrary.

The power supply switch 14F is arranged on the surface 10*a* of the wireless communication device 10. The power supply switch 14F is a switch for switching between ON and OFF of a power supply of the wireless communication device 10. A position at which the power supply switch 14F is not limited to the surface 10*a*, but can be arbitrary.

The switch 14A, the switch 14B, the switch 14C, the switch 14D, the volume operation unit 14E, and the power supply switch 14F may collectively be referred to as an operation unit 14. In the present embodiment, for example, the operation unit 14 receives operation of switching between an enabled state and a disabled state of an intermittent reception mode. The operation unit 14 is not limited to a button, a switch, a lever, a key, or the like, but can be arbitrarily configured.

The microphone 16 is arranged on the surface 10*a* of the wireless communication device 10. The microphone 16 receives input of voice from the user of the wireless communication device 10. The microphone 16 converts the input voice of the user of the wireless communication device 10 to a voice signal. The voice signal that is converted by the microphone 16 is transmitted from the antenna 12 to other wireless communication devices as a transmission signal. A position at which the microphone 16 is arranged is not limited to the surface 10*a*, but can be arbitrary.

The display 18 is arranged on the surface 10*a* of the wireless communication device 10. The display 18 displays various kinds of information. The display 18 is, for example, a display including a Liquid Crystal Display (LCD), an organic Electro-Luminescence (EL), or the like.

The speaker 20 is arranged on the surface 10*a* of the wireless communication device 10. The speaker 20 outputs a voice signal that the wireless communication device 10 has received from other wireless communication devices. A position at which the speaker 20 is arranged is not limited to the surface 10*a*, but can be arbitrary.

The speaker connection terminal 22 is arranged on a side surface 10*d* of the wireless communication device 10. The speaker connection terminal 22 is a connection terminal to which an external speaker is connectable. When an external speaker is connected to the speaker connection terminal 22, the external speaker functions as a speaker of the wireless communication device 10. A position at which the speaker connection terminal 22 is arranged is not limited to the side surface 10*d*, but can be arbitrary.

The microphone connection terminal 24 is arranged on the side surface 10*d* of the wireless communication device 10. The microphone connection terminal 24 is a connection terminal to which an external microphone is connectable. When an external microphone is connected to the microphone connection terminal 24, the external microphone functions as a microphone of the wireless communication device 10. A position at which the microphone connection terminal 24 is arranged is not limited to the side surface 10*d*, but can be arbitrary.

Figure 2:
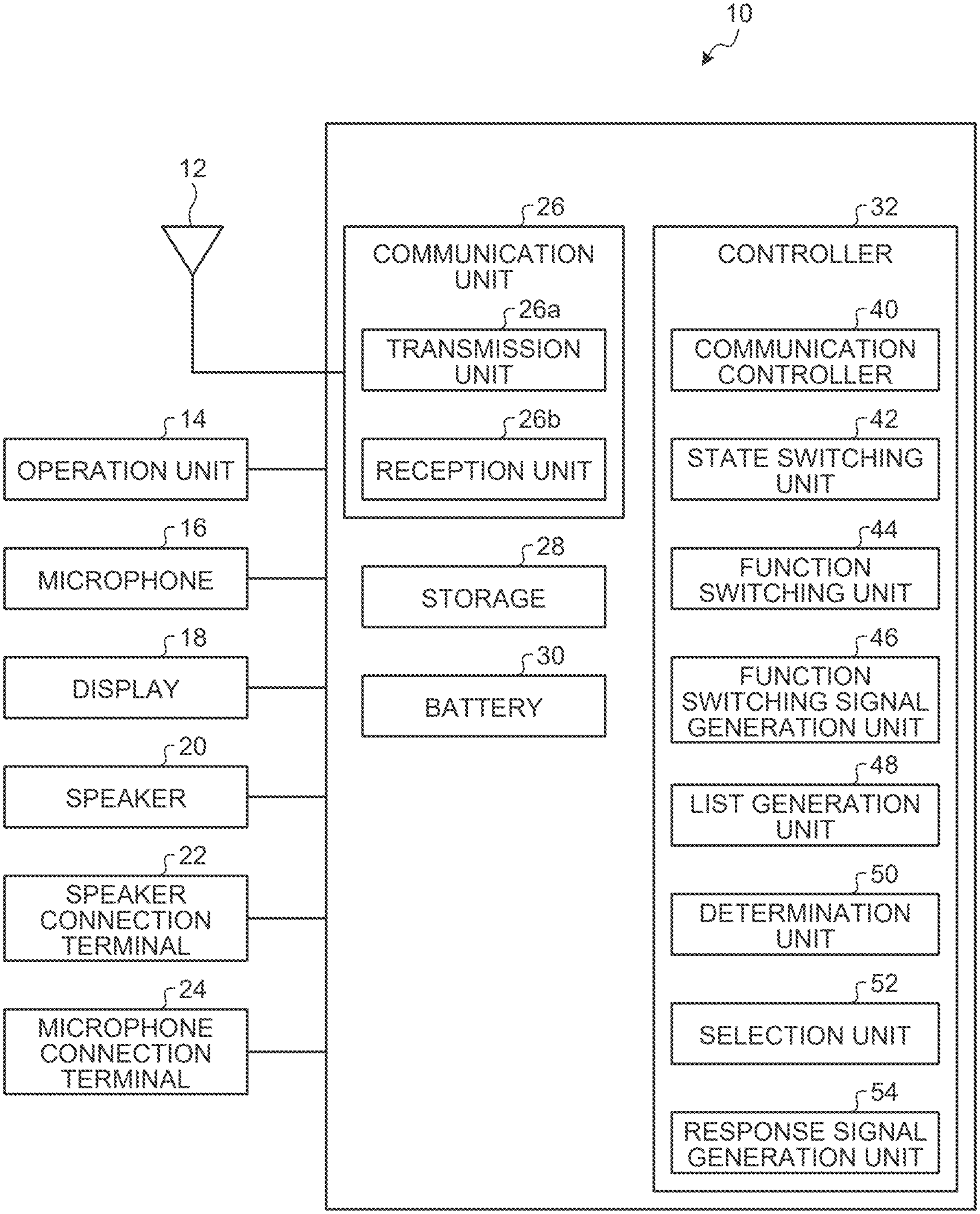
FIG. 2 is a block diagram illustrating a configuration example of the wireless communication device according to the first embodiment.

FIG. 2 is a block diagram illustrating a configuration example of the wireless communication device according to the first embodiment. As illustrated in FIG. 2, the wireless communication device 10 includes the antenna 12, the operation unit 14, the microphone 16, the display 18, the speaker 20, the speaker connection terminal 22, the microphone connection terminal 24, a communication unit 26, a storage 28, a battery 30, and a controller 32.

The communication unit 26 includes a transmission unit 26*a* and a reception unit 26*b*. The transmission unit 26*a* is, for example, a circuit that coverts a voice signal output from the microphone 16 to a transmission signal under control of a communication controller 40 (described later). The reception unit 26*b* is, for example, a circuit that generates a voice signal by demodulating a transmission signal received by the antenna 12 under the control of the communication controller 40 (described later).

The storage 28 stores therein, for example, information such as details of calculation performed by the controller 32 and a program. The storage 28 stores therein identification information for uniquely identifying each of other wireless communication devices that perform group communication with the wireless communication device 10. In the present embodiment, the storage 28 stores therein a response information list (described later). The storage 28 includes, for example, at least one of a main storage device, such as a Random Access Memory (RAM) or a Read Only Memory (ROM), and an external storage device, such as a Hard Disk Drive (HDD).

The battery 30 is arranged inside the wireless communication device 10. The battery 30 stores therein electric power for operating the wireless communication device 10.

The controller 32 controls each of units of the wireless communication device 10. The controller 32 includes, for example, an information processing device, such as a Central Processing Unit (CPU) or a Micro Processing Unit (MPU), and a storage device, such as a RAM or a ROM. The controller 32 executes a program for controlling operation of the wireless communication device 10 according to the present application. The controller 32 may be implemented by, for example, an integrated circuit, such as an Application Specific Integrated Circuit (ASIC) or a Field Programmable Gate Array (FPGA). The controller 32 may be implemented by a combination of hardware and software.

The controller 32 includes the communication controller 40, a state switching unit 42, a function switching unit 44, a function switching signal generation unit 46, a list generation unit 48, a determination unit 50, a selection unit 52, and a response signal generation unit 54.

The communication controller 40 causes the transmission unit 26*a* to transmit a transmission signal to other wireless communication devices. The communication controller 40 causes the reception unit 26*b* to demodulate a reception signal that is received by the antenna 12 from other wireless communication devices and generate a voice signal.

The state switching unit 42 switches between a normal state and an emergency state of the wireless communication device 10. The emergency state indicates a situation in which the user of the wireless communication device 10 gets involved in an accident and need to urgently communicate with other wireless communication devices. The emergency state may also be referred to as an emergency mode. The state switching unit 42 may automatically change to the emergency mode based on a signal of an acceleration sensor or a biosensor (not illustrated) or may switch to the emergency mode in accordance with operation that is input to the operation unit 14.

The function switching unit 44 switches between an enabled state and a disabled state of a battery save function of the battery 30. In a state in which the battery save function is enabled, the wireless communication device 10 transitions to an intermittent reception mode in which a reception waiting state and a sleep state are repeated at regular intervals. In a state in which the battery save function is disabled, the wireless communication device 10 transitions to a reception waiting mode.

For example, when the state of the wireless communication device 10 transitions to the emergency mode, the function switching unit 44 disables the battery save function and causes the wireless communication device 10 to enter a waiting state. The function switching unit 44 may disable the battery save function in accordance with operation that is input to the operation unit 14, for example.

When the wireless communication device 10 receives, from other wireless communication devices, a function switching signal for switching between the enabled state and the disabled state of the battery save function, the function switching unit 44 switches between the enabled state and the disabled state of the battery save function in accordance with the received function switching signal. When receiving a first function switching signal (described later), the battery save function is switched to the disabled state by the function switching unit 44. When receiving a second function switching signal (described later), the battery save function is switched to the enabled state by the function switching unit 44.

When the state switching unit 42 switches the state of the wireless communication device 10, the function switching signal generation unit 46 generates a function switching signal for switching between a enabled state and a disabled state of a battery save function of other wireless communication devices. The function switching signal for disabling the battery save function of other wireless communication devices when the wireless communication device 10 transitions from the normal state to the emergency state will be referred to as the first function switching signal. The function switching signal for enabling the battery save function of other wireless communication devices when the wireless communication device 10 transitions from the emergency state to the normal state will be referred to as the second function switching signal. The function switching signal generation unit 46 generates the function switching signal when the wireless communication device 10 transitions to the emergency mode. The function switching signal is transmitted, as a transmission signal, from the antenna 12 to other wireless communication devices.

Figures 3, 4:
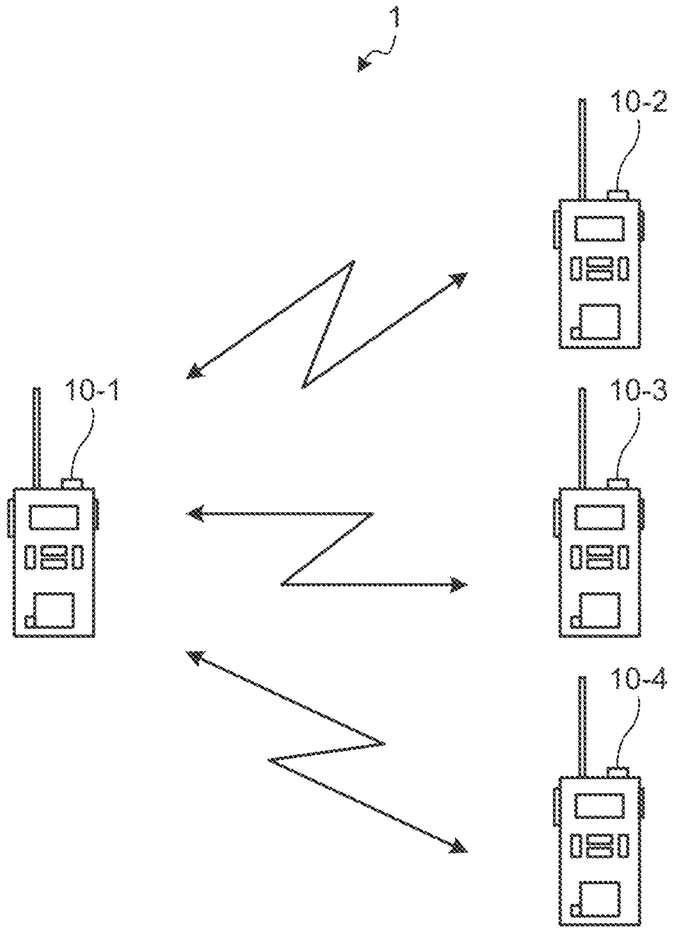
FIG. 3 is a diagram illustrating an example of a response information list according to the first embodiment.
FIG. 4 is a diagram for explaining an overview of processes performed by the wireless communication device according to the first embodiment.

The list generation unit 48 generates a response information list. FIG. 3 is a diagram illustrating an example of the response information list according to the first embodiment. The storage 28 stores therein a response information list 28*a*. The response information list 28*a* includes items such as an "ID", "first response signal reception information", "first function switching signal transmission information", and "battery remaining capacity information".

The "ID" is an ID number for uniquely identifying each of the wireless communication devices that participate in group communication. The "first response signal reception information" indicates whether or not a first response signal is received from other wireless communication devices in response to the first function switching signal. The first response signal may be Acknowledgement (ACK). When the first response signal is received from other wireless communication devices, the list generation unit 48 stores a check in a corresponding column. The "first function switching signal transmission information" indicates whether or not the first function switching signal is transmitted to other wireless communication devices. The "first function switching signal transmission information" is a kind of instruction signal transmission information. When the first function switching signal is transmitted to other wireless communication devices, the list generation unit 48 stores a check in a corresponding column. The "battery remaining capacity information" indicates information on a remaining capacity of a battery of each of other wireless communication devices. When the first response signal to the first function switching signal is received from other wireless communication devices, the list generation unit 48 stores information indicating a battery remaining capacity that is included in the first response signal in a corresponding column. The list generation unit 48 will be described in detail later.

The determination unit 50 determines, after a predetermined time that is set in advance from the transmission of the first function switching signal to other wireless communication devices, whether or not a wireless communication device with which the first response signal reception information is not associated is present in the response information list 28*a*. The determination unit 50 will be described in detail later.

The selection unit 52 selects, in the response information list 28*a*, a wireless communication device with an ID with which the first function switching signal transmission information is not associated and with which the first response signal reception information is associated, as a relay destination wireless communication device. The relay destination wireless communication device indicates a wireless communication device that transmits the first function switching signal instead of the wireless communication device 10. The selection unit 52 will be described in detail later.

The response signal generation unit 54 generates the first response signal to the first function switching signal that is received from other wireless communication devices. The response signal generation unit 54 generates the first response signal by, for example, including the battery remaining capacity information on the remaining capacity of the battery 30. The first response signal is transmitted from the antenna 12 to other wireless communication devices.

Details of Processes

Overview of Process

FIG. 4 is a diagram for explaining processes performed by the wireless communication device according to the first embodiment. As illustrated in FIG. 4, a wireless communication system 1 includes a wireless communication device 10-1, a wireless communication device 10-2, a wireless communication device 10-3, and a wireless communication device 10-4. The wireless communication device 10-1, the wireless communication device 10-2, the wireless communication device 10-3, and the wireless communication device 10-4 are wireless communication devices that belong to the same group for performing group communication. In the following, explanation will be given based on the assumption that the wireless communication device 10-1 transitions to the emergency mode and the wireless communication system 1 includes the four wireless communication devices. However, the number of the wireless communication devices is not limited to this example. For example, the number of wireless communication devices that perform the group communication may be a several dozen.

In the example illustrated in FIG. 4, it is assumed that the wireless communication device 10-1 transitions to the emergency mode. In this case, the wireless communication device 10-1 disables the battery save functions of the wireless communication device 10-2, the wireless communication device 10-3, and the wireless communication device 10-4 to enable prompt communication.

Flowchart

Figure 5:
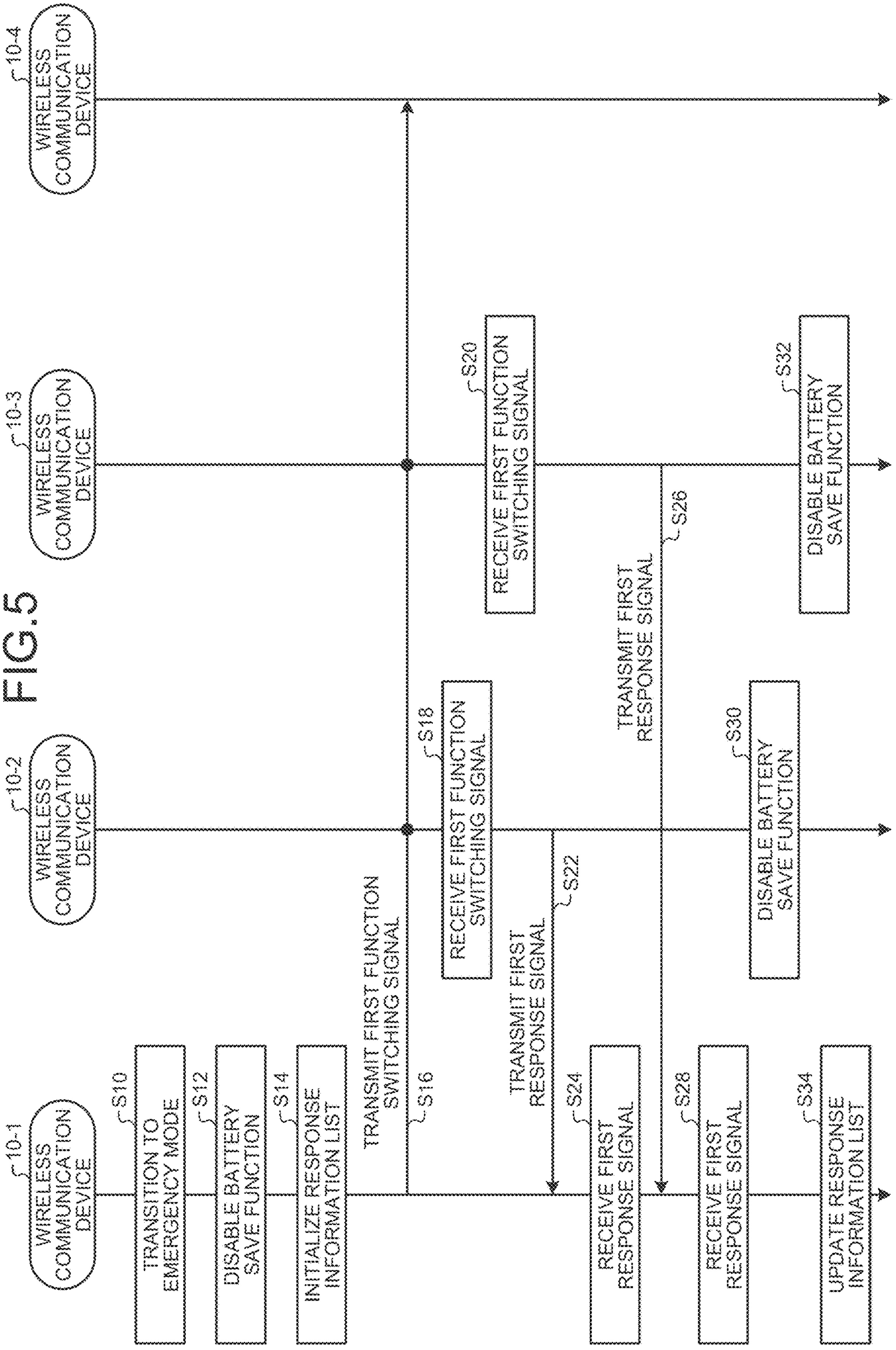
FIG. 5 is a flowchart illustrating a flow of processes performed by the wireless communication device according to the first embodiment.
Figure 6:
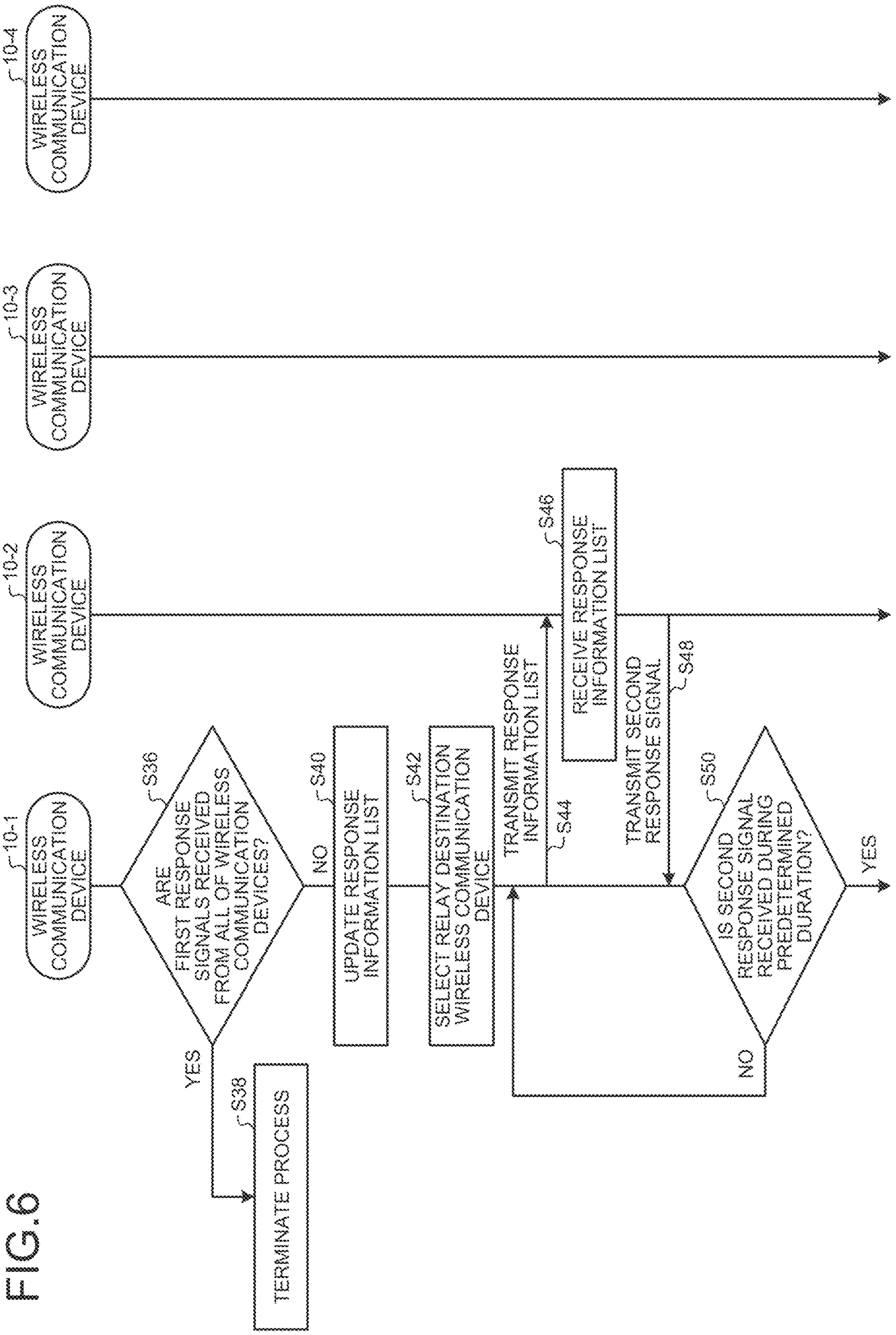
FIG. 6 is a flowchart illustrating a flow of processes performed by the wireless communication device according to the first embodiment.
Figure 7:
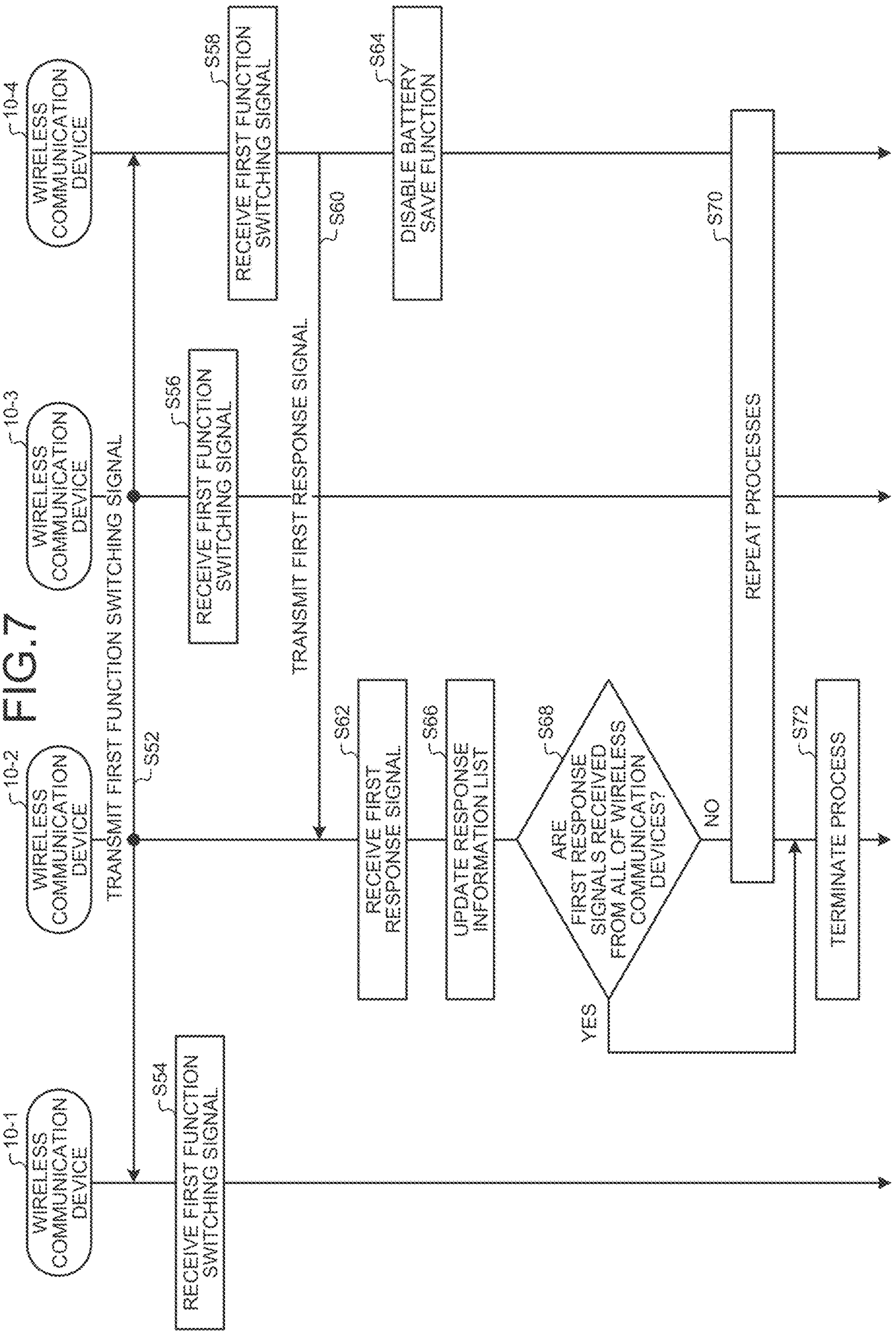
FIG. 7 is a flowchart illustrating a flow of processes performed by the wireless communication device according to the first embodiment.

Details of the processes performed by the wireless communication device according to the first embodiment will be described below with reference to FIG. 5, FIG. 6, and FIG. 7. FIG. 5 to FIG. 7 are flowcharts illustrating flows of the processes performed by the wireless communication device according to the first embodiment. Each of the processes from FIG. 5 to FIG. 7 is a process that is performed after the wireless communication device 10-1 transitions to the emergency mode and until the battery save function of each of the wireless communication devices is disabled.

FIG. 5 illustrates a flow of processes from when the wireless communication device 10-1 transitions to the emergency mode to when the battery save function of other wireless communication device is disabled.

The state switching unit 42 of the wireless communication device 10-1 is determined that an emergency has occurred to a user of the wireless communication device 10-1, and causes the wireless communication device 10-1 to transition to the emergency mode (Step S10). The function switching unit 44 of the wireless communication device 10-1 disables the battery save function of the wireless communication device 10-1 (Step S12).

The list generation unit 48 of the wireless communication device 10-1 initializes the response information list (Step S14). Specifically, the list generation unit 48 of the wireless communication device 10-1 deletes all of contents that are stored in the response information list 28a that is stored in the storage 28. Accordingly, even when contents are stored in the past in the response information list 28a, it is possible to appropriately use the response information list 28a by deleting the contents that are stored in the response information list 28a.

Figures 8, 9:
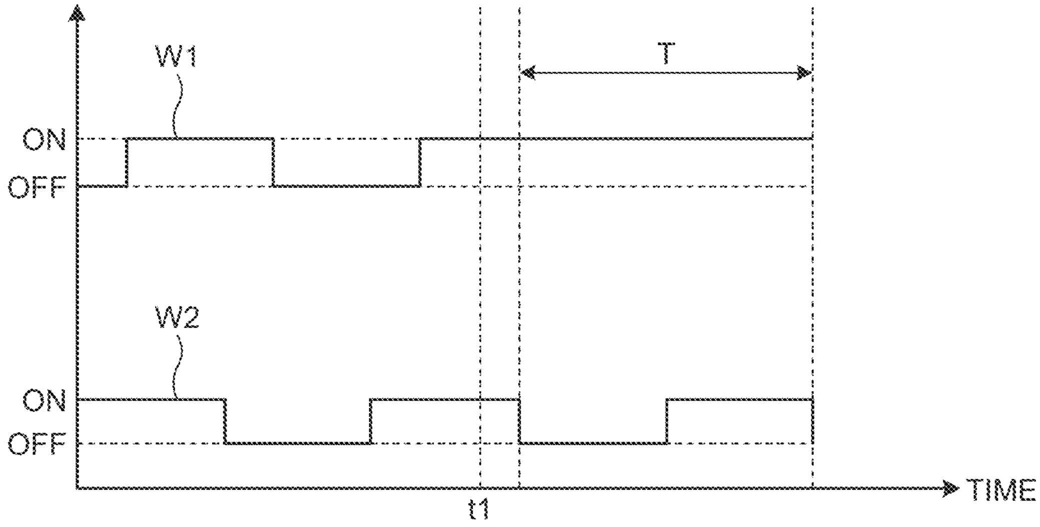
FIG. 8 is a diagram for explaining a method of setting a first duration according to the first embodiment.
FIG. 9 is a diagram for explaining a first response signal according to the first embodiment.

The communication controller 40 of the wireless communication device 10-1 causes the transmission unit 26a to transmit, via the antenna 12, the first function switching signal that is generated by the function switching signal generation unit 46 and that is for disabling the battery save function to the wireless communication device 10-2, the wireless communication device 10-3, and the wireless communication device 10-4 by group transmission (Step S16). Specifically, the communication controller 40 of the wireless communication device 10-1 continuously transmits the first function switching signal to the wireless communication device 10-2, the wireless communication device 10-3, and the wireless communication device 10-4 during a first duration. Here, the first duration is set to be longer than a single cycle of intermittent operation of the battery save function. FIG. 8 is a diagram for explaining a method of setting the first duration according to the first embodiment. In FIG. 8, a waveform W1 indicates an operation state of the wireless communication device 10-1 for each duration, and a waveform W2 indicates an operation state of the wireless communication device 10-2 for each duration. In FIG. 8, ON indicates a waiting state and OFF indicates a sleep state. The example illustrated in FIG. 8 indicates intermittent operation in which the battery save function is enabled and the waiting state and the sleep state are repeated periodically. In this case, it is assumed that the battery save function of the wireless communication device 10-1 is disabled at a timing t1 and the intermittent operation is terminated. A cycle T indicates a single cycle of the intermittent operation. The cycle T is set to, for example, a few tens of milliseconds to a few hundred milliseconds, but embodiments are not limited to this example. In this case, the first duration is set to about one second to two seconds that is longer than the cycle T, but embodiments are not limited to this example. The communication controller 40 continuously transmits the first function switching signal to the wireless communication device 10-2, the wireless communication device 10-3, and the wireless communication device 10-4 for a period of about one second to two seconds after the timing t1. Accordingly, even when the battery save function of the wireless communication device 10-2 is enabled and a period of the sleep state exists, the wireless communication device 10-2 can appropriately receive the first function switching signal. Meanwhile, the communication controller 40 may intermittently transmit the first function switching signal to the wireless communication device 10-2, the wireless communication device 10-3, and the wireless communication device 10-4 at intervals of a few hundred milliseconds during the period of about one second to two seconds, for example.

The communication controller 40 of the wireless communication device 10-2 receives the first function switching signal from the wireless communication device 10-1 (Step S18). The communication controller 40 of the wireless communication device 10-3 receives the first function switching signal from the wireless communication device 10-1 (Step S20). In the example illustrated in FIG. 5, it is assumed that the wireless communication device 10-4 has failed to receive the first function switching signal.

The communication controller 40 of the wireless communication device 10-2, after a first waiting time, transmits the first response signal that is generated by the response signal generation unit 54 of the wireless communication device 10-2 in response to the first function switching signal to the wireless communication device 10-1 (Step S22). FIG. 9 is a diagram for explaining the first response signal according to the first embodiment. As illustrated in FIG. 9, the first response signal includes items such as a "transmission destination ID", a "transmission source ID", "response signal type information", and "battery remaining capacity information". The "transmission destination ID" stores therein an ID of the wireless communication device that receives the first response signal. In the example illustrated in FIG. 9, A1 is conceptually illustrated. However, in reality, a specific ID is stored. The "transmission source ID" stores therein an ID of the wireless communication device that transmits the first response signal. In the example illustrated in FIG. 9, B1 is conceptually illustrated. However, in reality, a specific ID is stored. The "response signal type information" stores therein information indicating that a signal is the first response signal. In the example illustrated in FIG. 9, C1 is conceptually illustrated. However, in reality, specific information is stored. The "battery remaining capacity information" stores therein information indicating a remaining capacity of the battery 30 of the wireless communication device that transmits the first response signal. In the example illustrated in FIG. 9, D1 is conceptually illustrated. However, in reality, specific information is stored.

The communication controller 40 of the wireless communication device 10-1 receives the first response signal from the wireless communication device 10-2 (Step S24).

The communication controller 40 of the wireless communication device 10-3, after a second waiting time, transmits the first response signal that is generated by the response signal generation unit 54 of the wireless communication device 10-3 to the wireless communication device 10-1 (Step S26). The communication controller 40 of the wireless communication device 10-1 receives the first response signal from the wireless communication device 10-3 (Step S28).

The first waiting time at Step S22 and the second waiting time at Step S26 are different times. By setting the first waiting time and the second waiting time to different times, the wireless communication device 10-2 and the wireless communication device 10-3 intermittently transmit the first response signal, so that it is possible to prevent a conflict of timing of transmission of the first response signal. The first waiting time and the second waiting time may be arbitrarily set. However, it is preferable to set values based on, for example, IDs of the devices. For example, the first waiting time and the second waiting time may be set to values that are obtained by multiplying the subject IDs by 0.5 second.

At Step S24 and Step S28, after transmitting the first function switching signal, the communication controller 40 of the wireless communication device 10-1 receives the first response signal from the respective wireless communication devices during a second duration. The second duration is set to be longer than a waiting time for all of the wireless communication devices from reception of the first function switching signal to transmission of the first response signal. For example, when an interval of the waiting time of each of the wireless communication devices is set to 0.5 second and the number of the wireless communication devices that participate in the group communication is 50, the second duration is set to be $50 \times 0.5 = 25$ seconds. In this case, the second duration may be set to about 20 seconds to 30 seconds. Meanwhile, the method of setting the second duration is not limited to the example as described above.

The function switching unit 44 of the wireless communication device 10-2 disables the battery save function of the wireless communication device 10-2 (Step S30) and the wireless communication device 10-3 (Step S32).

The list generation unit 48 of the wireless communication device 10-1 updates the response information list 28*a* every time the first response signal is received during the second duration (Step S34). The list generation unit 48 of the wireless communication device 10-1 reflects, in the response information list 28*a*, contents that are included in the first response signal that is received from each of the wireless communication devices. FIG. 10 is a diagram illustrating an example of the updated response information list according to the first embodiment.

FIG. 10 illustrates a response information list 28Aa that is obtained by updating the response information list 28*a*. In the example illustrated in FIG. 10, it is assumed that an ID of the wireless communication device 10-1 is an "ID1", an ID of the wireless communication device 10-2 is an "ID2", an ID of the wireless communication device 10-3 is an "ID3", and an ID of the wireless communication device 10-4 is an "ID4".

The list generation unit 48 of the wireless communication device 10-1, after receiving the first response signal from the wireless communication device 10-2 and the wireless communication device 10-3, stores information indicating that the first response signal is received in columns of the "first response signal reception information". In the example illustrated in FIG. 10, the information indicating that the first response signal is received is illustrated by check marks, but embodiments are not limited to this example. The list generation unit 48 of the wireless communication device 10-1 stores information indicating that the battery remaining capacities of the wireless communication device 10-2 and the wireless communication device 10-3 are respectively 90% and 75% in columns of the "battery remaining capacity information". In the example illustrated in FIG. 10, the "battery remaining capacity information" is indicated by percentages of the remaining capacities, but it may be possible to use voltage values of the batteries, and embodiments are not limited to this example.

The list generation unit 48 of the wireless communication device 10-1 stores, for the sake of convenience, information indicating that the first response signal is received in a column of the "first response signal reception information" of the device that has transmitted the first function switching signal. The list generation unit 48 of the wireless communication device 10-1 stores information indicating that the battery remaining capacity is 80% in a column of the "battery remaining capacity". Then, the process in FIG. 5 is terminated.

FIG. 6 illustrates processes continuously performed after the processes in FIG. 5. FIG. 6 illustrates a flow of processes until transmission of the response information list 28Aa to the relay destination wireless communication device.

The determination unit 50 of the wireless communication device 10-1 determines whether or not the first response signals are received from all of the wireless communication devices (Step S36). Specifically, the determination unit 50 of the wireless communication device 10-1 refers to the response information list 28Aa, and when check marks are added to all of the columns of the "first response signal reception information", the determination unit 50 determines that the first response signals are received from all of the wireless communication devices. In the example illustrated in FIG. 10, the check mark is not added to the column of the "first response signal reception information" for "ID4", and therefore, the determination unit 50 of the wireless communication device 10-1 determines that the first response signal is not received from all of the wireless communication devices. When it is determined that the first response signals are received from all of the wireless communication devices (Step S36; Yes), a state for appropriately communication is ensured, so that the process is terminated (Step S38). When it is determined that the first response signals are not received from all of the wireless communication devices (Step S36; No), the list generation unit 48 of the wireless communication device 10-1 updates the response information list 28Aa (Step S40). FIG. 11 is a diagram illustrating an example of an updated response information list according to the first embodiment.

FIG. 11 illustrates a response information list 28Ba that is obtained by updating the response information list 28Aa. As illustrated in FIG. 11, the list generation unit 48 of the wireless communication device 10-1 stores a check mark indicating that the first function switching signal is transmitted in a column of "first function switching signal transmission information" for "ID1".

The selection unit 52 of the wireless communication device 10-1 selects the relay destination wireless communication device (Step S42). Specifically, the selection unit 52 of the wireless communication device 10-1 selects, in the response information list 28Ba, a wireless communication device for which the check mark is stored in the column of the "first response signal reception information", for which the check mark is not stored in the column of the "first function switching signal transmission information", and for which the battery remaining capacity indicated in the column of the "battery remaining capacity information" is the largest, as the relay destination wireless communication device. In the example illustrated in FIG. 11, the selection unit 52 of the wireless communication device 10-1 selects the wireless communication device 10-2 with the "ID2" as the relay destination wireless communication device.

When, for example, multiple wireless communication devices meet the selection condition, the selection unit 52 of the wireless communication device 10-1 may select the wireless communication device with the "ID" of the smallest number as the relay destination wireless communication device. The selection unit 52 of the wireless communication device 10-1 may select, for example, the wireless communication device with the "ID" of the largest number as the relay destination wireless communication device.

The communication controller 40 of the wireless communication device 10-1 causes the transmission unit 26*a* to transmit the response information list 28Ba to the wireless communication device 10-2 via the antenna 12 (Step S44).

The communication controller 40 of the wireless communication device 10-2 causes the reception unit 26*b* to receive the response information list 28Ba via the antenna 12 (Step S46). The wireless communication device 10-2, by receiving the response information list 28Ba, serves as a wireless communication device that transmits the first function switching signal to other wireless communication devices.

The communication controller 40 of the wireless communication device 10-2 transmits, to the wireless communication device 10-1, a second response signal that is generated by the response signal generation unit 54 of the wireless communication device 10-2 in response to the response information list 28Ba (Step S48). FIG. 12 is a diagram for explaining the second response signal according to the first embodiment. As illustrated in FIG. 12, the second response signal includes items such as a "transmission destination ID", a "transmission source ID", and "response signal type information". The "transmission destination ID" stores therein an ID of the wireless communication device that receives the second response signal. In the example illustrated in FIG. 12, A11 is conceptually illustrated. However, in reality, a specific ID is stored. The "transmission source ID" stores therein an ID of the wireless communication device that transmits the second response signal. In the example illustrated in FIG. 12, B11 is conceptually illustrated. However, in reality, a specific ID is stored. The "response signal type information" stores therein information indicating that a signal is the second response signal. In the example illustrated in FIG. 12, C11 is conceptually illustrated. However, in reality, specific information is stored.

The communication controller 40 of the wireless communication device 10-1 determines whether or not the second response signal is received during a predetermined duration (Step S50). Specifically, the communication controller 40 of the wireless communication device 10-1 determines whether or not the second response signal is received during a third duration that is longer than a transmission duration of the response information list 28Ba. If it is determined that the second response signal is received within the predetermined duration (Step S50; Yes), the process goes to Step S52 illustrated in FIG. 7. If it is not determined that the second response signal is received within the predetermined duration (Step S50; No), the process goes to Step S44.

FIG. 7 illustrates processes continuously performed after the processes in FIG. 6. FIG. 7 illustrates a flow of processes performed until the battery save functions of all of the wireless communication devices are disabled.

The communication controller 40 of the wireless communication device 10-2 causes the transmission unit 26*a* to transmit, via the antenna 12, the first function switching signal that is generated by the function switching signal generation unit 46 to the wireless communication device 10-1, the wireless communication device 10-3, and the wireless communication device 10-4 by group communication (Step S52). A specific process is the same as the process at Step S16, and therefore, explanation thereof will be omitted.

The communication controller 40 of the wireless communication device 10-1 receives the first function switching signal from the wireless communication device 10-2 (Step S54). The communication controller 40 of the wireless communication device 10-3 receives the first function switching signal from the wireless communication device 10-2 (Step S56). The communication controller 40 of the wireless communication device 10-4 receives the first function switching signal from the wireless communication device 10-2 (Step S58).

The wireless communication device 10-1, the wireless communication device 10-3, and the wireless communication device 10-4 wait for different times, and thereafter transmit the first response signals to the wireless communication device 10-2. Here, the wireless communication device that has already transmitted the first function switching signal and the wireless communication device that has once transmitted the first response signal need not transmit the first response signal to the wireless communication device 10-2. In the example illustrated in FIG. 7, the wireless communication device 10-1 and the wireless communication device 10-3 do not transmit the first response signal to the wireless communication device 10-2. The communication controller 40 of the wireless communication device 10-4, after receiving the first function switching signal, transmits the first response signal to the wireless communication device 10-2 after a predetermined waiting time (Step S60).

The communication controller 40 of the wireless communication device 10-2 receives the first response signal from the wireless communication device 10-4 (Step S62). The wireless communication device 10-2, after transmitting the first function switching signal, receives the first response signal from each of the wireless communication devices during the second duration.

The function switching unit 44 of the wireless communication device 10-4 disables the battery save function of the wireless communication device 10-4 (Step S64).

The list generation unit 48 of the wireless communication device 10-2 updates the response information list 28Ba every time the first response signal is received during the second duration (Step S66). The list generation unit 48 of the wireless communication device 10-2 reflects, in the response information list 28Ba, contents that are included in the first response signal received from each of the wireless communication devices. FIG. 13 is a diagram illustrating an example of an updated response information list according to the first embodiment.

FIG. 13 illustrates a response information list 28Ca that is obtained by updating the response information list 28Ba. As illustrated in FIG. 13, the list generation unit 48 of the wireless communication device 10-2 receives the first response signal from the wireless communication device 10-4, and thereafter stores information indicating that the first response signal is received in a column of the "first response signal reception information". The list generation unit 48 of the wireless communication device 10-2 stores information indicating that the battery remaining capacity of the wireless communication device 10-4 is 82% in the column of the "battery remaining capacity information".

The determination unit 50 of the wireless communication device 10-2 determines whether or not the first response signals are received from all of the wireless communication devices (Step S68). Specifically, the determination unit 50 of the wireless communication device 10-2 refers to the response information list 28Ca, and when check marks are added to all of columns of the "first response signal reception information", the determination unit 50 determines that the first response signals are received from all of the wireless communication devices. In the example illustrated in FIG. 13, the determination unit 50 of the wireless communication device 10-2 determines that the first response signals are received from all of the wireless communication devices. When it is determined that that the first response signals are received from all of the wireless communication devices (Step S68; Yes), a state for appropriately communication is ensured, so that the process is terminated (Step S72). When it is not determined that that the first response signals are received from all of the wireless communication devices (Step S68; No), the process goes to Step S70.

When it is determined as No at Step S68, the processes from Step S40 to Step S68 as illustrated in FIG. 6 and FIG. 7 are repeated (Step S70). Specifically, the processes from Step S40 to Step S68 are repeated until the first response signals are received from all of the wireless communication devices that participate in the group communication. Further, even when all of the wireless communication devices that participate in the group communication transmit the first function switching signals and the first response signals are not received from all of the wireless communication devices, it may be possible to reset the processes and repeat the processes from the beginning or it may be possible to terminate the processes.

At Step S72, the communication controller 40 of the wireless communication device 10-2 may transmit a completion notice to the wireless communication device 10-1 that is in the emergency mode. The user of the wireless communication device 10-1 is able to recognize that all of the wireless communication devices that participate in the group communication enter the waiting states. Accordingly, by transmitting a message to be conveyed after checking the completion notice, the user of the wireless communication device 10-1 is able to more reliably convey the message to all of the wireless communication devices that participate in the group communication. When the completion notice is to be transmitted, it is preferable that the response information list 28Ca includes information for identifying the wireless communication device that is in the emergency mode. FIG. 14 is a diagram for explaining a response information list according to a modification of the first embodiment.

FIG. 14 illustrates a response information list 28Da. The response information list 28Da includes items such as "first response signal reception information", "first function switching signal transmission information", "battery remaining capacity information", and "emergency state information". The list generation unit 48 of the wireless communication device 10-1 may, in the process at Step S40 for example, store a check mark indicating that the own device is in the emergency state in a column of the "emergency state information". Accordingly, other wireless communication devices are able to recognize that the wireless communication device 10-1 is in the emergency state.

As described above, in the first embodiment, the wireless communication device that has transitioned to the emergency mode is able to disable the battery save function of other wireless communication devices that participate in the group communication. With this configuration, a user of the wireless communication device that is in the emergency mode is able to appropriately convey a message to other wireless communication devices that participate in the group communication.

Second Embodiment

A second embodiment will be described below. In the second embodiment, a process in which, after the battery save functions of all of the wireless communication devices are disabled, the battery save functions of all of the wireless communication devices are enabled will be described. A configuration of a wireless communication device according to the second embodiment is the same as the wireless communication device 10 illustrated in FIG. 1 and FIG. 2, and therefore, explanation thereof will be omitted.

FIG. 15 illustrates an example of a response information list according to the second embodiment. In the second embodiment, the storage 28 stores therein a response information list 28*b*. The response information list 28*b* includes items such as an "ID", "third response signal reception information", "second function switching signal transmission information", and a "battery remaining capacity".

The "third response signal reception information" indicates whether or not a third response signal is received from other wireless communication devices in response to the second function switching signal that is for enabling the battery save function. The "second function switching signal transmission information" indicates whether or not the second function switching signal is transmitted to other wireless communication devices. The "second function switching signal transmission information" is a kind of instruction signal transmission information. In the second embodiment, with use of the response information list 28*b*, it is possible to appropriately enable the battery save functions of all of the wireless communication devices that participate in group communication.

Flowchart

Figure 16:
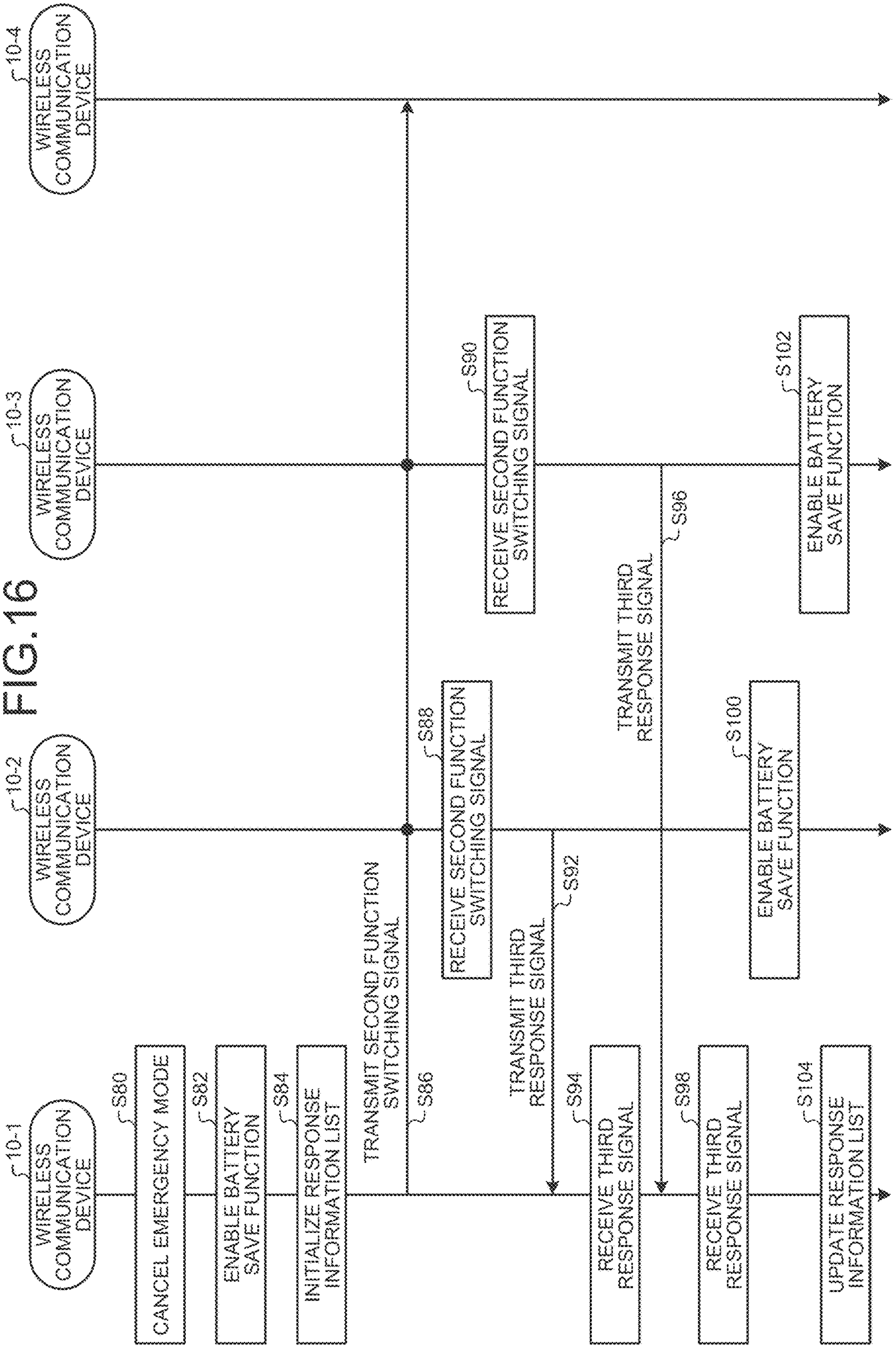
FIG. 16 is a flowchart illustrating a flow of processes performed by a wireless communication device according to the second embodiment.
Figure 17:
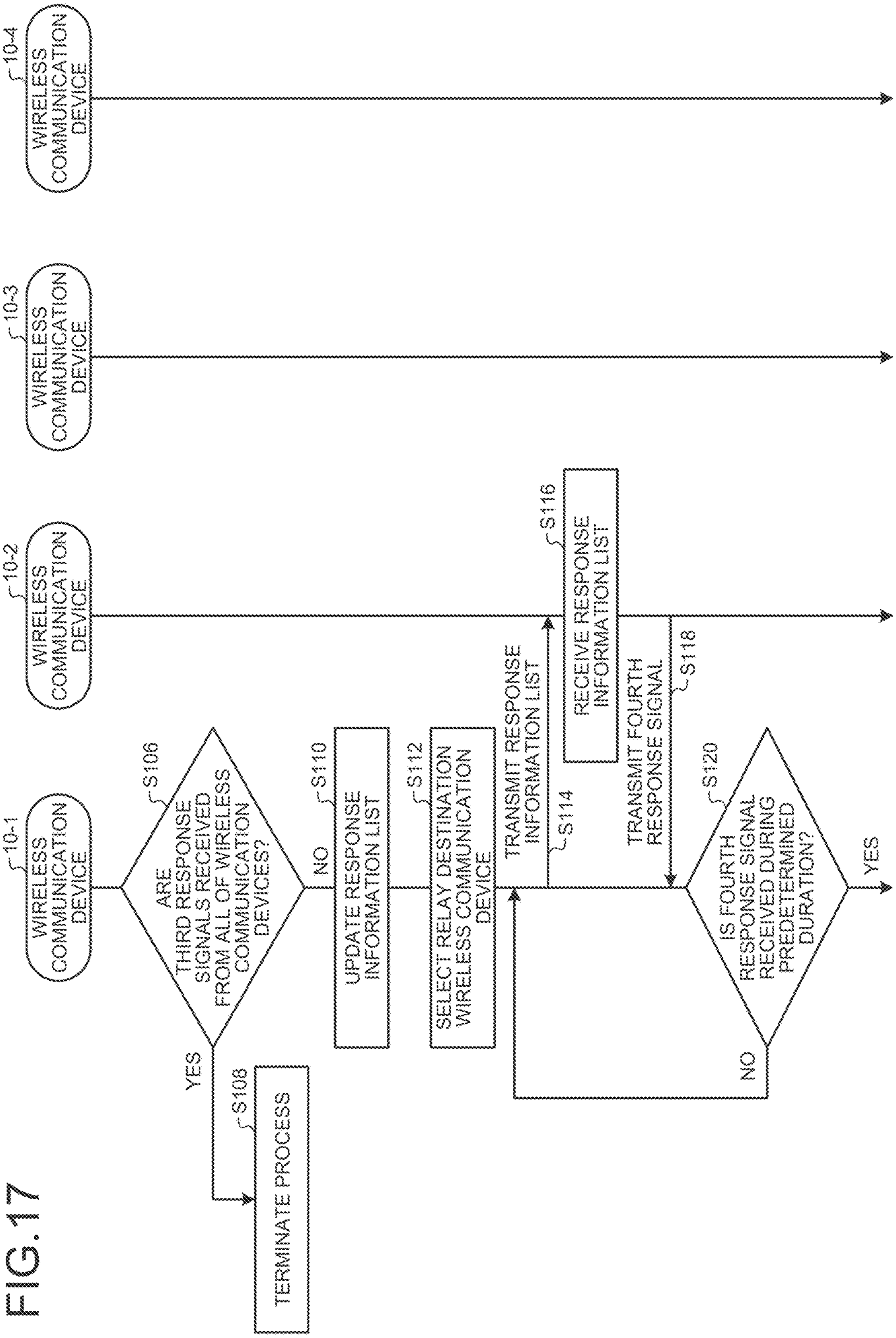
FIG. 17 is a flowchart illustrating a flow of processes performed by the wireless communication device according to the second embodiment.
Figure 18:
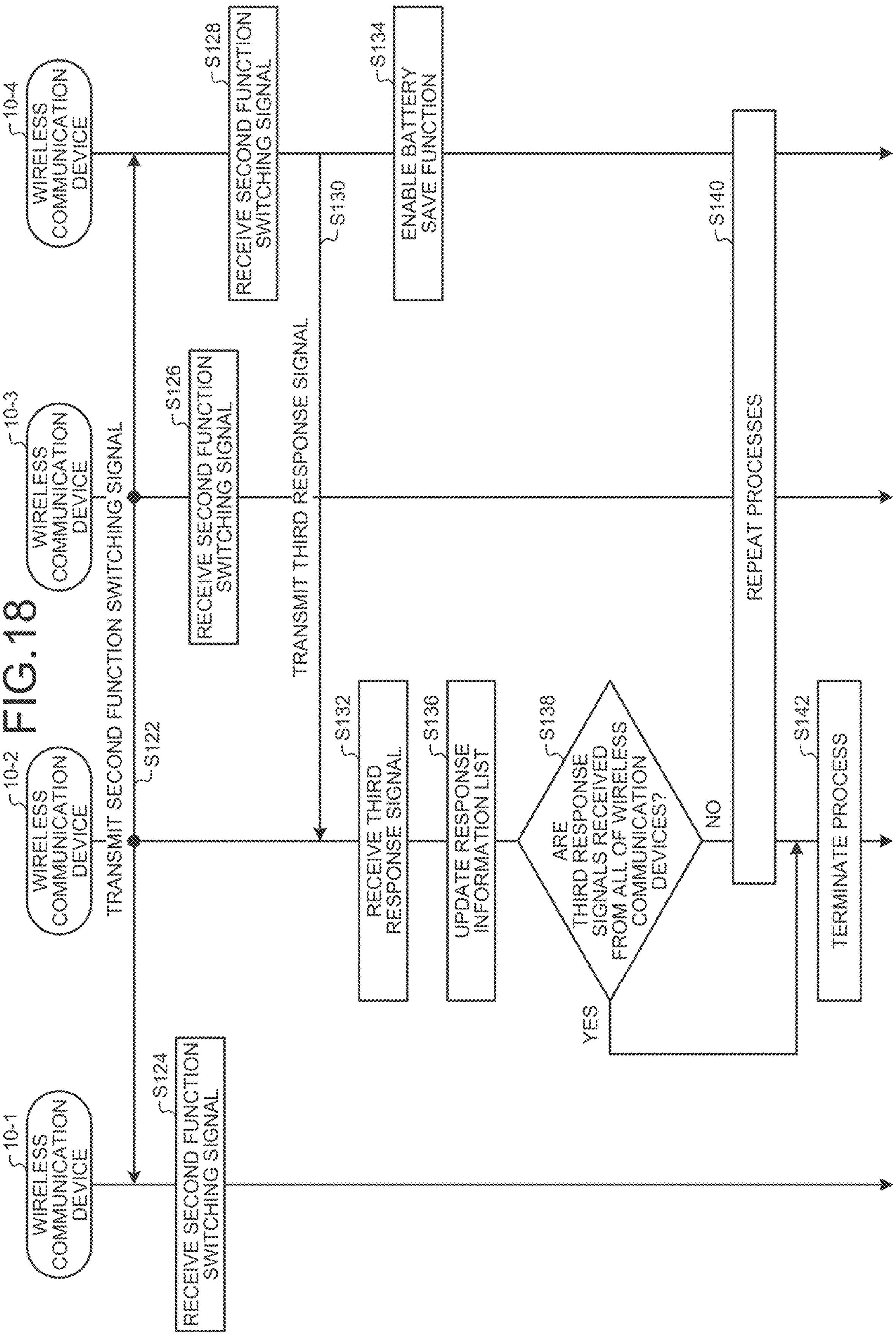
FIG. 18 is a flowchart illustrating a flow of processes performed by the wireless communication device according to the second embodiment.

Details of processes performed by the wireless communication device according to the second embodiment will be described below with reference to FIG. 16, FIG. 17, and FIG. 18. FIG. 16 to FIG. 18 are flowcharts illustrating flows of processes performed by the wireless communication device according to the second embodiment.

FIG. 16 illustrates a flow of processes from when the wireless communication device 10-1 cancels the emergency mode to when the battery save function of other wireless communication devices is enabled.

The state switching unit 42 of the wireless communication device 10-1, when determining that the emergency state of the wireless communication device 10-1 is cancelled, cancels the emergency mode of the wireless communication device 10-1 (Step S80). The function switching unit 44 of the wireless communication device 10-1 enables the battery save function of the wireless communication device 10-1 (Step S82).

The list generation unit 48 initializes the response information list (Step S84). Specifically, the list generation unit 48 deletes all of contents that are stored in the response information list 28*b* that is stored in the storage unit 28. Even when contents are stored in the past in the response information list 28*b*, it is possible to appropriately use the response information list 28*b* by deleting the contents that are stored in the response information list 28*b*.

The communication controller 40 causes the transmission unit 26*a* to transmit, via the antenna 12, the second function switching signal that is generated by the function switching signal generation unit 46 and that is for enabling the battery save function to the wireless communication device 10-2, the wireless communication device 10-3, and the wireless communication device 10-4 by group communication (Step S86). Specifically, the communication controller 40 continuously transmits the second function switching signal to the wireless communication device 10-2, the wireless communication device 10-3, and the wireless communication device 10-4 during the first duration.

The communication controller 40 of the wireless communication device 10-2 receives the second function switching signal from the wireless communication device 10-1 (Step S88). The communication controller 40 of the wireless communication device 10-3 receives the second function switching signal from the wireless communication device 10-1 (Step S90). In the example illustrated in FIG. 16, it is assumed that the wireless communication device 10-4 has failed to receive the second function switching signal.

The communication controller 40 of the wireless communication device 10-2, after the first waiting time, transmits the third response signal that is generated by the response signal generation unit 54 of the wireless communication device 10-2 in response to the second function switching signal to the wireless communication device 10-1 (Step S92). The third response signal is the same as the first response signal illustrated in FIG. 9 except that information indicating that the signal is the third response signal is stored in the "response signal type information", and therefore, explanation thereof will be omitted.

The communication controller 40 of the wireless communication device 10-1 receives the third response signal from the wireless communication device 10-2 (Step S94).

The communication controller 40 of the wireless communication device 10-3, after the second waiting time, transmits the third response signal that is generated by the response signal generation unit 54 of the wireless communication device 10-3 to the wireless communication device 10-1 (Step S96). The communication controller 40 of the wireless communication device 10-1 receives the third response signal from the wireless communication device 10-3 (Step S98).

The first waiting time at Step S92 and the second waiting time at Step S96 are respectively the same as the first waiting time at Step S22 and the second waiting time at Step S26 illustrated in FIG. 5, and therefore, explanation thereof will be omitted.

Specific processes at Step S94 and Step S98 are the same as the processes at Step S24 and Step S28 illustrated in FIG. 5, and therefore, explanation thereof will be omitted.

The function switching unit 44 of the wireless communication device 10-2 enables the battery save function of the wireless communication device 10-2 (Step S100) and the wireless communication device 10-3 (Step S102).

The list generation unit 48 of the wireless communication device 10-1 updates the response information list 28*b* every time the third response signal is received during the second duration (Step S104). The list generation unit 48 of the wireless communication device 10-1 reflects, in the response information list 28*a*, contents that are included in the third response signal that is received from each of the wireless communication devices. FIG. 19 is a diagram illustrating an example of the updated response information list according to the second embodiment.

FIG. 19 illustrates the response information list 28Ab that is obtained by updating the response information list 28*b*. In the example illustrated in FIG. 19, it is assumed that an ID of the wireless communication device 10-1 is "ID1", an ID of the wireless communication device 10-2 is "ID2", an ID of the wireless communication device 10-3 is "ID3", and an ID of the wireless communication device 10-4 is "ID4".

The list generation unit 48 of the wireless communication device 10-1, after receiving the third response signal from the wireless communication device 10-2 and the wireless communication device 10-3, stores information indicating that the third response signal is received in columns of the "third response signal reception information". In the example illustrated in FIG. 19, the information indicating that the third response signal is received is illustrated by check marks, but embodiments are not limited to this example. The list generation unit 48 of the wireless communication device 10-1 stores information indicating that the battery remaining capacities of the wireless communication device 10-2 and the wireless communication device 10-3 are respectively 90% and 75% in columns of the "battery remaining capacity information".

The list generation unit 48 of the wireless communication device 10-1 stores, for the sake of convenience, information indicating that the third response signal is received in a column of the "third response signal reception information" of the own device that has transmitted the second function switching signal. The list generation unit 48 of the wireless communication device 10-1 stores information indicating that the battery remaining capacity is 80% in a column of the "battery remaining capacity". Then, the process in FIG. 16 is terminated.

FIG. 17 illustrates processes continuously performed after the processes in FIG. 16. FIG. 17 illustrates a flow of processes by transmission of a response information list 28Ab to the relay destination wireless communication device.

The determination unit 50 of the wireless communication device 10-1 determines whether or not the third response signals are received from all of the wireless communication devices (Step S106). Specifically, the determination unit 50 of the wireless communication device 10-1 refers to the response information list 28Ab, and when the check marks are added to all of the columns of the "third response signal reception information", the determination unit 50 determines that the third response signals are received from all of the wireless communication device. In the example illustrated in FIG. 19, the check mark is not added to the column of "third response signal reception information" for "ID4", and therefore, the determination unit 50 of the wireless communication device 10-1 determines that the third response signals are not received from all of the wireless communication devices. When it is determined that the third response signals are received from all of the wireless communication devices (Step S106; Yes), the battery save functions of all of the wireless communication devices are enabled, so that the process is terminated (Step S108). When it is determined that the third response signals are not received from all of the wireless communication devices (Step S106; No), the list generation unit 48 of the wireless communication device 10-1 updates the response information list 28Ab (Step S110). FIG. 20 is a diagram illustrating an example of the updated response information list according to the second embodiment.

FIG. 20 illustrates a response information list 28Bb that is obtained by updating the response information list 28Ab. As illustrated in FIG. 20, the list generation unit 48 of the wireless communication device 10-1 stores a check mark indicating that the second function switching signal is transmitted in a column of the "second function switching signal transmission information" for "ID1".

The selection unit 52 of the wireless communication device 10-1 selects the relay destination wireless communication device (Step S112). Specifically, the selection unit 52 of the wireless communication device 10-1 selects, in the response information list 28Bb, a wireless communication device for which the check mark is stored in the column of the "third response signal reception information", for which the check mark is not stored in the column of the "second function switching signal transmission information", and for which the battery remaining capacity indicated in the column of the "battery remaining capacity information" is the largest, as the relay destination wireless communication device. In the example illustrated in FIG. 20, the selection unit 52 of the wireless communication device 10-1 selects the wireless communication device 10-2 with the "ID2" as the relay destination wireless communication device.

When, for example, multiple wireless communication devices meet the selection condition, the selection unit 52 of the wireless communication device 10-1 may select the wireless communication device with the "ID" of the smallest number as the relay destination wireless communication device. In this case, the selection unit 52 of the wireless communication device 10-1 selects the wireless communication device 10-2 with the "ID" of the smallest number as the relay destination wireless communication device.

The communication controller 40 of the wireless communication device 10-1 causes the transmission unit 26*a* to transmit the response information list 28Bb to the wireless communication device 10-2 via the antenna 12 (Step S114).

The communication controller 40 of the wireless communication device 10-2 causes the reception unit 26*b* to receive the response information list 28Bb via the antenna 12 (Step S116). The wireless communication device 10-2, by receiving the response information list 28Bb, serves as a wireless communication device that transmits the second function switching signal to other wireless communication devices.

The communication controller 40 of the wireless communication device 10-2 transmits, to the wireless communication device 10-1, a fourth response signal that is generated by the response signal generation unit 54 of the wireless communication device 10-2 in response to the response information list 28Bb (Step S118). The fourth response signal is the same as the second response signal illustrated in FIG. 12 except that information indicating that the fourth response signal is stored in the column of the "response signal type information", and therefore, explanation thereof will be omitted.

The communication controller 40 of the wireless communication device 10-1 determines whether or not the fourth response signal is received in a predetermined duration (Step S120). Specifically, the communication controller 40 of the wireless communication device 10-1 determines whether or not the fourth response signal is received during the third duration that is longer than a transmission duration of the response information list 28Bb. If it is determined that the fourth response signal is received within the predetermined duration (Step S120; Yes), the process goes to Step S122 illustrated in FIG. 18. If it is not determined that the fourth response signal is received within the predetermined duration (Step S120; No), the process goes to Step S114.

FIG. 18 illustrates processes continuously performed after the processes in FIG. 17. FIG. 18 illustrates a flow of processes performed until the battery save functions of all of the wireless communication devices are enabled.

The communication controller 40 of the wireless communication device 10-2 causes the transmission unit 26*a* to transmit, via the antenna 12, the second function switching signal that is generated by the function switching signal generation unit 46 to the wireless communication device 10-1, the wireless communication device 10-3, and the wireless communication device 10-4 by group communication (Step S122). A specific process is the same as the process at Step S16, and therefore, explanation thereof will be omitted.

The communication controller 40 of the wireless communication device 10-1 receives the second function switching signal from the wireless communication device 10-2 (Step S124). The communication controller 40 of the wireless communication device 10-3 receives the second function switching signal from the wireless communication device 10-2 (Step S126). The communication controller 40 of the wireless communication device 10-4 receives the second function switching signal from the wireless communication device 10-2 (Step S128).

The wireless communication device 10-1, the wireless communication device 10-3, and the wireless communication device 10-4 wait for different times respectively, and thereafter transmit the third response signals to the wireless communication device 10-2. The wireless communication device that has already transmitted the second function switching signal and the wireless communication device that has once transmitted the third response signal need not transmit the third response signal to the wireless communication device 10-2. In the example illustrated in FIG. 18, the wireless communication device 10-1 and the wireless communication device 10-3 do not transmit the third response signal to the wireless communication device 10-2. The communication controller 40 of the wireless communication device 10-4, after receiving the second function switching signal, transmits the third response signal to the wireless communication device 10-2 after a predetermined waiting time (Step S130).

The communication controller 40 of the wireless communication device 10-2 receives the third response signal from the wireless communication device 10-4 (Step S132). The wireless communication device 10-2, after transmitting the second function switching signal, receives the third response signal from each of the wireless communication devices during the second duration.

The function switching unit 44 of the wireless communication device 10-4 enables the battery save function of the wireless communication device 10-4 (Step S134).

The list generation unit 48 of the wireless communication device 10-2 updates the response information list 28Bb every time the third response signal is received during the second duration (Step S136). The list generation unit 48 of the wireless communication device 10-2 reflects, in the response information list 28Ba, contents that are included in the third response signal that is received from each of the wireless communication devices. FIG. 21 is a diagram illustrating an example of an updated response information list according to the second embodiment.

FIG. 21 illustrates a response information list 28Cb that is obtained by updating the response information list 28Bb. As illustrated in FIG. 21, the list generation unit 48 of the wireless communication device 10-2 receives the third response signal from the wireless communication device 10-4 and thereafter stores information indicating that the third response signal is received in a column of the "third response signal reception information". The list generation unit 48 of the wireless communication device 10-2 stores information indicating that the battery remaining capacity of the wireless communication device 10-4 is 82% in the column of the "battery remaining capacity information".

The determination unit 50 of the wireless communication device 10-2 determines whether or not the third response signals are received from all of the wireless communication devices (Step S138). Specifically, the determination unit 50 of the wireless communication device 10-2 refers to the response information list 28Ca, and when check marks are added to all of the columns of the "third response signal reception information", the determination unit 50 determines that the third response signal is received from all of the wireless communication devices. In the example illustrated in FIG. 21, the determination unit 50 of the wireless communication device 10-1 determines that the third response signal is received from all of the wireless communication devices. When it is determined that the third response signal is received from all of the wireless communication devices (Step S138; Yes), a state for appropriately communication is ensured, so that the process is terminated (Step S142). When it is not determined that the third response signal is received from all of the wireless communication devices (Step S138; No), the process goes to Step S140.

When it is determined as No at Step S138, the processes from Step S110 to Step S138 as illustrated in FIG. 16 and FIG. 17 are repeated (Step S140). Specifically, the processes from Step S110 to Step S138 are repeated until the third response signal is received from all of the wireless communication devices that participate in the group communication. Further, even when all of the wireless communication devices that participate in the group communication transmit the second function switching signal and the third response signals are not received from all of the wireless communication devices, it may be possible to reset the processes and repeat the processes from the beginning or it may be possible to terminate the processes.

At Step S142, the communication controller 40 of the wireless communication device 10-2 may transmit a completion notice to the wireless communication device 10-1 that has cancelled the emergency mode. When the completion notice is to be transmitted, it is preferable that the response information list 28Ca includes information for identifying the wireless communication device that has cancelled the emergency mode. FIG. 22 is a diagram for explaining a response information list according to a modification of the second embodiment.

FIG. 22 illustrates a response information list 28Db. The response information list 28Db includes items such as "third response signal reception information", "second function switching signal transmission information", "battery remaining capacity information", and "emergency state cancellation information". The list generation unit 48 of the wireless communication device 10-1 may, in the process at Step S110 for example, store a check mark indicating that the own device is in the emergency canceled state in a column of the "emergency state cancellation information". Accordingly, other wireless communication devices are able to recognize that the emergency state of the wireless communication device 10-1 has been cancelled.

As described above, in the second embodiment, the wireless communication device that has cancelled the emergency mode is able to enable the battery save function of other wireless communication devices that participate in the group communication. With this configuration, a user of the wireless communication device that participates in the group communication is able to reduce power consumption of the battery of the wireless communication device.

The components of the devices illustrated in the drawings are functionally conceptual and do not necessarily have to be physically configured in the manner illustrated in the drawings. In other words, specific forms of distribution and integration of the devices are not limited to those illustrated in the drawings, and all or part of the devices may be functionally or physically distributed or integrated in arbitrary units depending on various loads or use conditions. Meanwhile, the distribution and integration may be performed dynamically.

While the embodiments of the present application have been described above, the present application is not limited by the embodiments described above. Further, the constituent elements described above include one that can be easily thought of by a person skilled in the art, one that is practically identical, and one that is within an equivalent range. Furthermore, the constituent elements described above may be combined appropriately. Moreover, within the scope not departing from the gist of the embodiments described above, various omission, replacement, and modifications of the constituent elements may be made.

The wireless communication device and the wireless communication method according to the present application may be used for, for example, a wireless communication device that can perform group communication.

According to the present application, it is possible to appropriately perform communication between wireless communication devices that have battery save functions.

What is claimed is:

1. A wireless communication device that has an intermittent reception mode in which a reception waiting state and a sleep state are repeated at regular intervals comprising:

a function switching signal generation unit configured to generate a function switching signal for switching between an enabled state and a disabled state of the intermittent reception mode;

a transmission unit configured to transmit the generated function switching signal to other wireless communication devices;

a reception unit configured to receive, from the other wireless communication devices, one of a response signal for the transmitted function switching signal and the function switching signal;

a function switching unit configured to switch between the enabled state and the disabled state of the intermittent reception mode in accordance with one of the generated function switching signal and the received function switching signal;

a list generation unit configured to generate a list by associating instruction signal transmission information indicating that the function switching signal is transmitted and response signal reception information indicating that the response signal is received with an identifier of each of the other wireless communication devices for group communication including the own wireless communication device;

a determination unit configured to determine whether the list includes the identifier with which the response signal reception information is not associated; and a selection unit configured to select, when the determination unit determines that the list includes the identifier with which the response signal reception information is not associated after a predetermined time set in advance from transmission of the function switching signal, at least one of the other wireless communication devices with which the response signal reception information is associated in the list as a relay destination wireless communication device, wherein the transmission unit is further configured to transmit the list to the relay destination wireless communication device.

2. The wireless communication device according to claim 1, wherein the response signal reception information includes remaining capacity information that indicates a remaining capacity of a battery of the wireless communication device that has transmitted the response signal reception information, the list generation unit is further configured to generate the list which includes the remaining capacity information in the response signal reception information and store the list in a storage, and the selection unit is further configured to select, when the multiple relay destination wireless communication devices are present, one of the multiple relay destination wireless communication devices as a transmission destination of the list based on the remaining capacity information.

3. The wireless communication device according to claim 1, wherein when the reception unit receives the list, the list generation unit is further configured to store the list received by the reception unit in a storage, and the transmission unit is further configured to transmit, when the identifier of the wireless communication device with which the response signal reception information is not associated is present in the list, the function switching signal to at least the wireless communication device with which the response signal reception information is not associated.

4. A wireless communication method that is implemented by a wireless communication device that has an intermittent reception mode in which a reception waiting state and a sleep state are repeated at regular intervals comprising:

generating a function switching signal for switching between an enabled state and a disabled state of the intermittent reception mode;

transmitting the generated function switching signal to other wireless communication devices;

receiving, from the other wireless communication devices, one of a response signal for the transmitted function switching signal and the function switching signal;

switching between the enabled state and the disabled state of the intermittent reception mode in accordance with one of the generated function switching signal and the received function switching signal;

generating a list by associating instruction signal transmission information indicating that the function switching signal is transmitted and response signal reception information indicating that the response signal is received with an identifier of each of the other wireless communication devices for group communication including the own wireless communication device;

determining whether the list includes the identifier with which the response signal reception information is not associated; and selecting, when determining that the list includes the identifier with which the response signal reception information is not associated after a predetermined time set in advance from transmission of the function switching signal, at least one of the other wireless communication devices with which the response signal reception information is associated in the list as a relay destination wireless communication device, wherein the transmitting further comprises transmitting the list to the relay destination wireless communication device.

5. The wireless communication method according to claim 4, wherein the response signal reception information includes remaining capacity information that indicates a remaining capacity of a battery of the wireless communication device that has transmitted the response signal reception information, at the generating of the list, the list which includes the remaining capacity information in the response signal reception information is generated and stored in a storage, and at the selecting, when the multiple relay destination wireless communication devices are present, one of the multiple relay destination wireless communication devices is selected as a transmission destination of the list based on the remaining capacity information.

6. The wireless communication method according to claim 4, wherein when the list is received, the received list is stored in a storage, and at the transmitting, the function switching signal is transmitted, when the identifier of the wireless communication device with which the response signal reception information is not associated is present in the list, to at least the wireless communication device with which the response signal reception information is not associated.

* * * * *